United States Patent
Syrjärinne et al.

(10) Patent No.: US 8,760,345 B2
(45) Date of Patent: Jun. 24, 2014

(54) SUPPORTING A SATELLITE BASED POSITIONING

(75) Inventors: Jari Syrjärinne, Tampere (FI); Harri Valio, Kämmenniemi (FI); Kimmo Alanen, Lempäälä (FI); Samuli Pietilä, Tampere (FI); Tuomo Honkanen, Tampere (FI)

(73) Assignee: Nokia Corporation, Espoo (FI)

( * ) Notice: Subject to any disclaimer, the term of this patent is extended or adjusted under 35 U.S.C. 154(b) by 1981 days.

(21) Appl. No.: 11/885,200

(22) PCT Filed: Feb. 28, 2005

(86) PCT No.: PCT/IB2005/000505
§ 371 (c)(1),
(2), (4) Date: Oct. 29, 2008

(87) PCT Pub. No.: WO2006/090200
PCT Pub. Date: Aug. 31, 2006

(65) Prior Publication Data
US 2009/0140918 A1    Jun. 4, 2009

(51) Int. Cl.
*G01S 19/09* (2010.01)
*G01S 19/33* (2010.01)

(52) U.S. Cl.
CPC ......... *G01S 19/09* (2013.01); *G01S 19/33* (2013.01)
USPC ............. 342/357.46; 342/357.06; 342/357.73

(58) Field of Classification Search
USPC .......................... 342/357.06, 357.46, 357.73
See application file for complete search history.

(56) References Cited

U.S. PATENT DOCUMENTS

| | | | |
|---|---|---|---|
| 6,078,290 A * | 6/2000 | McBurney et al. | 342/417 |
| 6,081,691 A | 6/2000 | Renard et al. | |
| 6,150,980 A * | 11/2000 | Krasner | 342/357.29 |
| 6,392,591 B1 * | 5/2002 | Hsu et al. | 342/357.4 |
| 6,542,823 B2 | 4/2003 | Garin et al. | |
| 6,593,878 B2 * | 7/2003 | Fall | 342/357.4 |

(Continued)

FOREIGN PATENT DOCUMENTS

| | | |
|---|---|---|
| JP | 7294624 | 11/1995 |
| JP | 8047042 | 2/1996 |

(Continued)

OTHER PUBLICATIONS

Motorola Semiconductor Technical Data "Product Preview" pp. 1-4.
www.ti.com/gps "Wireless Solutions: A-GPS", pp. 1-2.
http://www.mcc-us.com/i2chowto.htm "MICC The I²C Bus and How to Use It".

(Continued)

*Primary Examiner* — Frank J McGue
(74) *Attorney, Agent, or Firm* — Locke Lord LLP (57) ABSTRACT

A satellite signal receiver 40 comprises a measurement component 43 adapted to perform measurements on received satellite signals. In order to enable an enhanced handling of the measurements, the receiver further comprises a first processing unit 44 adapted to run a software 45 for controlling the measurement component 43 based on received control parameters. In addition, it comprises a first interface component 46 adapted to receive control parameters via another interface component 34 from another processing unit 35, adapted to provide the control parameters to the first processing unit 44 and adapted to forward measurement results from the measurement component 43 via the other interface component 34 to the other processing unit 35.

21 Claims, 4 Drawing Sheets

(56) References Cited

U.S. PATENT DOCUMENTS

| | | |
|---|---|---|
| 6,646,595 B1 | 11/2003 | Heng et al. |
| 6,684,158 B1 | 1/2004 | Garin et al. |
| 6,703,971 B2 * | 3/2004 | Pande et al. ............. 342/357.23 |
| 2002/0145560 A1 * | 10/2002 | Tsujimoto et al. ....... 342/357.09 |
| 2002/0145601 A1 | 10/2002 | Mino et al. |
| 2004/0107092 A1 | 6/2004 | Harada |
| 2004/0192345 A1 | 9/2004 | Osborn et al. |
| 2006/0036365 A1 * | 2/2006 | Chiayee et al. ............... 701/213 |

FOREIGN PATENT DOCUMENTS

| | | |
|---|---|---|
| JP | 11258326 | 9/1999 |
| JP | 11304904 | 11/1999 |
| JP | 2002296336 | 10/2002 |
| JP | 2004201005 | 7/2004 |
| JP | 2005535901 | 11/2005 |
| WO | 2004/017092 | 2/2004 |
| WO | 2006/043123 | 4/2006 |

OTHER PUBLICATIONS

Japanese Office Action dated Aug. 31, 2010 in corresponding Japanese Patent Application No. 2007-556667 (3 pages) and an English translation thereof (4 pages).

English Abstract of Japanese Unexamined Patent Publication No. 11-258326 published Sep. 24, 1999, McBurney et al (1 page).

English Abstract of Japanese Unexamined Patent Publication No. 8-047042 published Feb. 16, 1996, Kiyoaki et al (1 page).

European Office Action dated Nov. 8, 2010 in parallel European Patent Application No. 05708618.3 (6 pages).

Chinese Office Action mailed Dec. 13, 2010 in parallel Chinese Patent Application No. 200580048644.7 (6 pages) and English translation thereof (11 pages).

Japanese Office Action mailed Feb. 22, 2011 in parallel Japanese Patent Application No. 2007-556667 (3 pages) and English translation thereof (5 pages) (8 pages total).

Patent Abstracts of Japan, Japanese Publication No. 2004-201005, published Jul. 15, 2004, Okada Tsutomu (1 page).

* cited by examiner

Fig. 4

SUPPORTING A SATELLITE BASED POSITIONING

CROSS-REFERENCE TO RELATED APPLICATION

This application is the U.S. National Stage of International Application Number PCT/IB2005/000505 filed Feb. 28, 2005 and published Aug. 31, 2006 in English under International Publication Number WO 2006/090200.

FIELD OF THE INVENTION

The invention relates to a satellite signal receiver and to a mobile arrangement supporting a satellite based positioning. The invention relates equally to a method for supporting a satellite based positioning. The invention further relates to an interface and to software codes for a mobile arrangement supporting a satellite based positioning.

BACKGROUND OF THE INVENTION

Currently there are two operating satellite based positioning systems, the American system GPS (Global Positioning System) and the Russian system GLONASS (Global Orbiting Navigation Satellite System). In the future, there will be moreover a European system called GALILEO. A general term for these systems is GNSS (Global Navigation Satellite System).

For GPS, for example, more than 20 satellites orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a nominal bandwidth of 20.46 MHz. It is repeated every 1023 bits, the epoch of the code being 1 ms. The bits of the C/A code are also referred to as chips. The carrier frequency of the L1 signal is further modulated with navigation information at a bit rate of 50 bit/s. The navigation information comprises in particular a timestamp indicating the time of transmission and ephemeris parameters. Ephemeris parameters describe short sections of the orbit of the respective satellite. Based on these ephemeris parameters, an algorithm can estimate the position of the satellite for any time while the satellite is in the respective described section.

A GPS receiver of which the position is to be determined receives the signals transmitted by the currently available satellites, and it detects and tracks the channels used by different satellites based on the different comprised C/A codes. For the acquisition and tracking of a satellite signal, a signal received by a radio frequency (RF) portion of the GPS receiver is first converted into the baseband. In a baseband portion, frequency errors, for instance due to the Doppler effect, are removed by a mixer. Then, the signal is correlated with replica codes that are available for all satellites. The correlation can be performed for example using a matched filter. The correlation values can further be integrated coherently and/or incoherently in order to increase the sensitivity of the acquisition. A correlation value exceeding a threshold value indicates the C/A code and the code phase, which are required for dispreading the signal and thus to regain the navigation information.

Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the time of flight required by the signal to propagate from the satellite to the receiver. By multiplying this time of flight with the speed of light, it is converted to the distance, or range, between the receiver and the respective satellite.

The computed distances and the estimated positions of the satellites then permit a calculation of the current position of the receiver, since the receiver is located at an intersection of the ranges from a set of satellites.

Similarly, it is the general idea of GNSS positioning to receive satellite signals at a receiver which is to be positioned, to measure the time it took the signals to propagate from an estimated satellite position to the receiver, to calculate therefrom the distance between the receiver and the respective satellite and further the current position of the receiver, making use in addition of the estimated positions of the satellites.

A GPS positioning can be performed in three different positioning modes. The first mode is a standalone GPS based positioning. This means that the GPS receiver receives signals from GPS satellites and calculates from these signals its position without any additional information from other sources. The second mode is a network-assisted mobile station based GPS (AGPS) positioning. For this mode, the GPS receiver may be associated to a mobile communication device. The GPS receiver can be integrated into the mobile communication device or be an accessory for the mobile communication device. A mobile communication network provides assistance data, which is received by the mobile communication device and forwarded to the GPS receiver to improve its performance. Such assistance data can be for example at least ephemeris, position and time information. The positioning calculations are performed also in this case in the GPS receiver. The third mode is a network-based mobile station assisted GPS positioning. For this mode, the GPS receiver is associated as well to a mobile communication device. In this mode, a mobile communication network provides at least acquisition assistance and time information via the mobile communication device to the GPS receiver for supporting the measurements. The measurement results are then provided via the mobile communication device to the mobile communication network, which calculates the position. The second and the third approach are also referred to in common as assisted-GPS (AGPS).

Due to the different kind of information that has to be processed in the receiver in the different modes, conventional receivers support either only one of these modes, or they support a switching between these modes.

Figure 1:
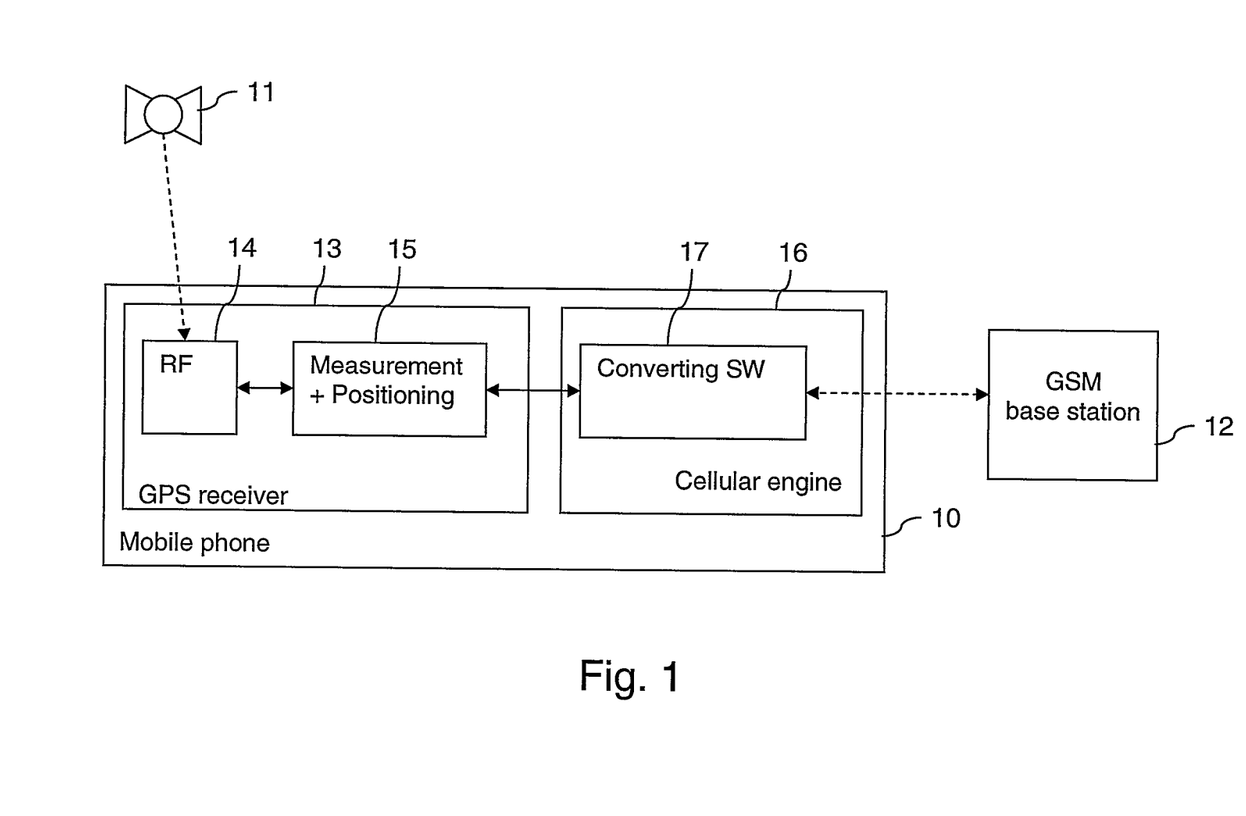
FIG. 1 is a schematic block diagram of a conventional assisted GPS system.

A conventional GPS receiver for a standalone GPS based positioning or an assisted standalone GPS based positioning comprises a single functional entity for performing the measurements, for controlling the measurements and for performing the positioning calculations. Performing the measurements is based at least partly on hardware, while controlling the measurements and for performing the positioning calculations is at least partly realized in software. This situation is illustrated in FIG. 1, which is a schematic block diagram of a satellite based positioning system.

The system comprises a mobile phone 10, a GPS satellite 11 and a base station 12 of a GSM network or of any other cellular network. The mobile phone 10 includes a GPS receiver 13. The GPS receiver 13 comprises an RF component 14 and a measurement and positioning component 15. The RF component 14 and the measurement and positioning component 15 can be implemented for example on separate chips or on a single chip. The mobile phone 10 further includes a cellular engine 16, that is, a module comprising all components required for a conventional mobile communication between the mobile phone 10 and the mobile communication network. The cellular engine 16 runs moreover converting software 17 that is adapted to convert assistance data provided by the base station 12 for use by the GPS receiver 13.

The assistance data protocols between the cellular engine 16 and different types of communication networks have been standardized and are already in use. More specifically, the Radio Resource Location services Protocol (RRLP) is used for Global System for Mobile communications (GSM) based networks, the Radio Resource Control (RRC) protocol is used for Wideband Code Division Multiple Access (WCDMA) based networks and the IS-801 protocol is used for Code Division Multiple Access (CDMA) based networks. These protocols are typically not supported in proprietary interfaces between a cellular engine 16 and a GPS receiver 13. Instead, the cellular engine 16 has to have the software 17 for converting the data provided in a network protocol into a suitable format.

More specifically, each GPS hardware vendor has specified a proprietary interface of its own for the interface between the GPS receiver 13 and the cellular engine 16. Typically, these interfaces are using the standard National Marine Electronics Association (NMEA) protocol for standalone GPS functionality and/or vendor specific messages for accessing more detailed information about the GPS receiver and/or specific messages to provide assistance data from the network to the GPS receiver for an AGPS functionality. Examples for these vendor specific formats are, for instance, the cellular modem interface by Texas Instruments and the GPS interface by Motorola.

Document U.S. Pat. No. 6,542,823 B2 describes a server which transmits data back and forth between a call processor sector and a GPS client.

Document WO 2004/107092 A1 describes the use of a translator in an interface between a call processor of a mobile device and a GPS module of a mobile device. The translator translates a protocol used for providing assistance data to the mobile device into an independent protocol used by the GPS module.

With the conventional GPS receivers, it is difficult to evaluate the true performance of the GPS measurement hardware. Equally, it is difficult to change from one GPS measurement hardware to another without extensive work on the software. Also an implementation of hybrid positioning solutions, using for example cellular network measurement data or motion sensor data, is rendered difficult.

SUMMARY OF THE INVENTION

The invention facilitates the handling of satellite signal measurements.

A satellite signal receiver supporting a satellite based positioning is proposed. The satellite signal receiver comprises a measurement component adapted to perform measurements on received satellite signals and a first processing unit adapted to run a software for controlling the measurement component based on received control parameters. The satellite signal receiver further comprises a first interface component adapted to receive control parameters via another interface component from another processing unit, adapted to provide the control parameters to the first processing unit and adapted to forward measurement results from the measurement component via the other interface component to the other processing unit.

Moreover, a mobile arrangement supporting a satellite based positioning is proposed. The mobile arrangement comprises the proposed satellite signal receiver. In addition, the mobile arrangement comprises the other processing unit. This other processing unit is adapted to run a control software for generating control parameters for the measurement component and an evaluation software for processing measurement results provided by the measurement component. The mobile arrangement further comprises the other interface component. This other interface component is adapted to transfer control parameters generated by the other processing unit to the first interface component and to forward measurement results received from the first interface component to the other processing unit.

Moreover, an interface for a mobile arrangement supporting a satellite based positioning is proposed. The mobile arrangement is assumed to comprise a satellite signal receiver, including a measurement component and a first processing unit. The mobile arrangement is further assumed to comprise another processing unit. The proposed interface is arranged for enabling a communication between the satellite signal receiver and the other processing unit. The interface comprises a first interface component in the satellite signal receiver and another interface component. The first interface component is adapted to receive control parameters from the other interface component, to provide the control parameters to the first processing unit and to forward measurement results from the measurement component to the other interface component. The other interface component is adapted to transfer control parameters generated by the other processing unit to the first interface component and to forward measurement results received from the first interface component to the other processing unit.

Moreover, a method for supporting a satellite based positioning in a mobile arrangement is proposed. The same assumptions are made for this mobile arrangement as in the case of the proposed interface. The proposed method comprises generating in the other processing unit control parameters for the satellite signal receiver and transferring the control parameters via an interface to the satellite signal receiver. The proposed method further comprises controlling in the satellite signal receiver measurements on received satellite signals by the measurement component by means of the first processing unit based on the transferred control parameters. The proposed method further comprises transferring measurement results of the measurement component via the interface to the other processing unit. The proposed method further comprises processing the transferred measurement results in the other processing unit.

Moreover, a first software code for a mobile arrangement supporting a satellite based positioning is proposed. The same assumptions are made for this mobile arrangement as in the case of the proposed interface. When running in the other processing unit, the first software code generates control parameters for the satellite signal receiver and causing a transfer of the control parameters to the satellite signal receiver via an interface. Further, the first software code processes measurement results received from the satellite signal receiver via the interface. Equally, a software program product is proposed, in which such a software code is stored.

Moreover, a second software code for a mobile arrangement supporting a satellite based positioning is proposed. The same assumptions are made for this mobile arrangement as in the case of the proposed interface. When running in the first processing unit, the second software code controls measurements on received satellite signals by the measurement component based on control parameters provided by the other processing unit via an interface. Further, the second software code causes a transfer of measurement results of the measurement component via the interface to the other processing unit. Equally, a software program product is proposed, in which such a software code is stored.

The invention is based on the idea that the measurement functions of a satellite signal receiver can be made use of in a more flexible way, if the control parameter generation and positioning functions are removed from the satellite signal receiver. It is therefore proposed that the control parameter generation functions and measurement processing functions are implemented instead in software that is run by a separate processing unit. The required communication between the satellite signal receiver and the separate processing unit is carried out via a new interface. This interface is adapted to provide low-level information in the form of the necessary control parameters for the measurement of received satellite signals. The term "low-level" relates to any aspect that relates to the real-time acquisition and tracking of satellite signals by the measurement component.

It is an advantage of the invention that it simplifies a performance evaluation and testing of the measurement component of the satellite signal receiver. Moreover, the satellite signal receiver itself is simplified due to the outsourced processing, which reduces the costs for the satellite signal receiver. In addition, the invention supports the development of satellite positioning solutions and reduces the required software work for such solutions. In a mobile arrangement according to the invention, for example, the measurement component can be changed freely to any other measurement component that is compatible with the employed interface, while in a conventional receiver, the software and the baseband measurement component are closely integrated and can thus not be changed without software adaptations.

The satellite signal receiver can be realized in various ways. It can be for instance a discrete chip comprising a radio frequency (RF) part and a baseband part in the same package. Further, it can be a chip set comprising an RF part and a baseband part in different packages. Further, it can be integrated together with other components of a mobile arrangement, for example with a cellular engine of a mobile communication device. It can also be partly integrated with another component and partly be implemented in a separate chip. For instance, the RF part could be integrated and the baseband measurement part be implemented in a separate chip.

The measurement component can be adapted in particular to perform a baseband processing of received signals, including all measurements that are to be carried out in the baseband, but it may equally be adapted, for instance, to perform any processing in the RF domain as well. The measurement component may be realized in hardware. Alternatively, it may be realized partly in hardware and partly in software, as in the case of a "Snapshot GPS" receiver or a "software GPS" receiver. A hardware and software based measurement component may comprise for example a memory for storing samples of a received satellite signal and a processor for processing the sampled and stored satellite signals. The processing can be performed more specifically by a low-level software and a logic for carrying out a signal acquisition, a signal tracking, a signal validation and a data reception.

In one embodiment of the invention, the measurement component is adapted to perform measurements on received satellite signals transmitted by satellites of at least two different satellite positioning systems, depending on a control by the software that is run by the first processing unit and thus on control parameters provided by the other processing unit. The measurement component may be adapted, for example, to measure GPS signals, GALILEO signals, GLONASS signals, or on any combination of these.

The software that is run by the first processing unit for controlling the measurement component based on the control parameters provided by the other processing unit can equally be a low-level software. It may be responsible, for example, for power-saving settings, for a frequency calibration, for a time calibration, for an automatic gain control (AGC) tuning, for a pulse per second (PPS) generation and/or for setting the measurement intervals. These tasks are also performed in a conventional satellite signal receiver, but in contrast to a conventional satellite signal receiver, the control data forming the basis for the control is generated externally according to the invention.

In one embodiment of the invention, the first processing unit is further adapted to run a software for converting measurement results of the measurement component into a suitable format for position information calculations in the other processing unit.

In one embodiment of the invention, the first processing unit can be used flexibly for at least two positioning modes including a standalone positioning, a network assisted positioning and a network based positioning. In either case, the functionality of the first processing unit may be essentially the same regardless of the positioning mode, that is, the satellite signal receiver may be modeless since it may use the same method for any positioning mode. This is possible, since the first processing unit does not have to evaluate received assistance information for generating the required control parameters in the network assisted mode and the network based mode, but receives for any mode directly implementable control parameters.

In a mobile arrangement, also the processing of measurement results performed by the other processing unit may be essentially the same in all supported positioning modes. This implies that positioning related information may be calculated in the mobile arrangement, even if the positioning mode is network based. This requires more processing power than a simple forwarding of measurements results, but it may also improve the performance in certain situations. For example, if the position is calculated in the terminal for a network based tracking application, the tracking performance and sensitivity could be better and the power consumption could smaller than in the case of positioning calculations in the network.

The control parameters are parameters that can be used directly without any further computations for a control of the measurement component. At the most, a format conversion is required. Advantageously, the control software run by the other processing component is adapted to generate control parameters for the measurement component already in a format which is suitable for the satellite signal receiver.

The control parameters may be of various kinds. They may comprise, for instance, expected signal characteristics, like the expected code phase at a certain time with a 1-sigma uncertainty, expected Doppler effects, like the expected Doppler frequency at a certain time with a 1-sigma uncertainty, other expected uncertainties, timing information, the quality of a reference frequency, etc. The control parameters may further comprise, for instance, various mode parameters, like a channel reset request, a power-save mode, a tracking mode, etc.

The control parameters can be generated for example entirely within the mobile arrangement. Further, they can be generated for example by converting available assistance data into a protocol independent format.

The proposed architecture thus allows removing from the receiver hardware all links to protocols and standards, for example cellular standards, based on which assistance data is provided.

The control software run by the other processing unit may also be responsible for generating necessary response messages according to a supported protocol, like NMEA or RRLP, to an entity providing assistance data.

It is to be understood that the evaluation software run by the other processing unit may also take into account other information than the satellite signal measurements, if it processes the measurement results in the scope of position information calculations.

Further, the interface may be employed as well for other types of messaging than GPS messaging. In one embodiment of the invention, the first interface component is further adapted to forward measurement results not relating to satellite positioning from the measurement component to the other interface component. The other interface component may then be adapted to forward these measurement results received from the first interface component to the other processing unit. Such additional measurement results may comprise for example results of sensor measurements, temperature measurements, air pressure measurements, acceleration measurements, compass direction measurements, etc.

In one embodiment of the invention, the proposed mobile arrangement comprises a mobile communication device, for instance a cellular phone. In this case, the control software and the evaluation software may be implemented in a software that is adapted to support communications of the mobile communication device via a mobile communication network. This software may be for instance the Intelligent software architecture (ISA) software by Nokia, a Symbian application or a Java application.

If the mobile arrangement comprises a mobile communication device, the mobile arrangement can be a mobile communication device in which the satellite signal receiver is integrated. Alternatively, the satellite signal receiver can be an accessory device for the mobile communication device.

In one embodiment of the invention, the first interface component and the other interface component are adapted to employ a dedicated protocol for exchanging control parameters and measurement results. This protocol may define a non-real time interface that is independent of cellular standards, that is independent of the satellite signal receiver hardware, in particular of a measurement hardware, and that enables the other positioning unit to co-operate with any satellite signal receiver supporting the interface.

The interface can employ in particular a low-level hardware connection between the interface components, for example a Universal Asynchronous Receiver and Transmitter (UART) connection, a Serial Peripheral Interface (SPI) connection, an Inter-Integrated Circuit bus (I2C) connection, a Bluetooth™ connection, an ultra wide band (UWB) connection, or an infra-red (IR) connection.

The invention can be employed for any mobile arrangement enabling a reception of satellite signals. It is to be understood that the invention can equally be employed with satellite augmentation systems like the Wide Area Augmentation System (WAAS) and the European Geostationary Navigation Overlay System (EGNOS). WAAS and EGNOS determine GPS correction data, which take account, for example, of GPS signal delays caused by the atmosphere and the ionosphere. The correction data is transmitted via geostationary satellites and the data can be received by suitable GPS receivers and be used for increasing the accuracy of a GPS based positioning.

BRIEF DESCRIPTION OF THE FIGURES

Other objects and features of the present invention will become apparent from the following detailed description considered in conjunction with the accompanying drawings.

DETAILED DESCRIPTION OF THE INVENTION

Figure 2:
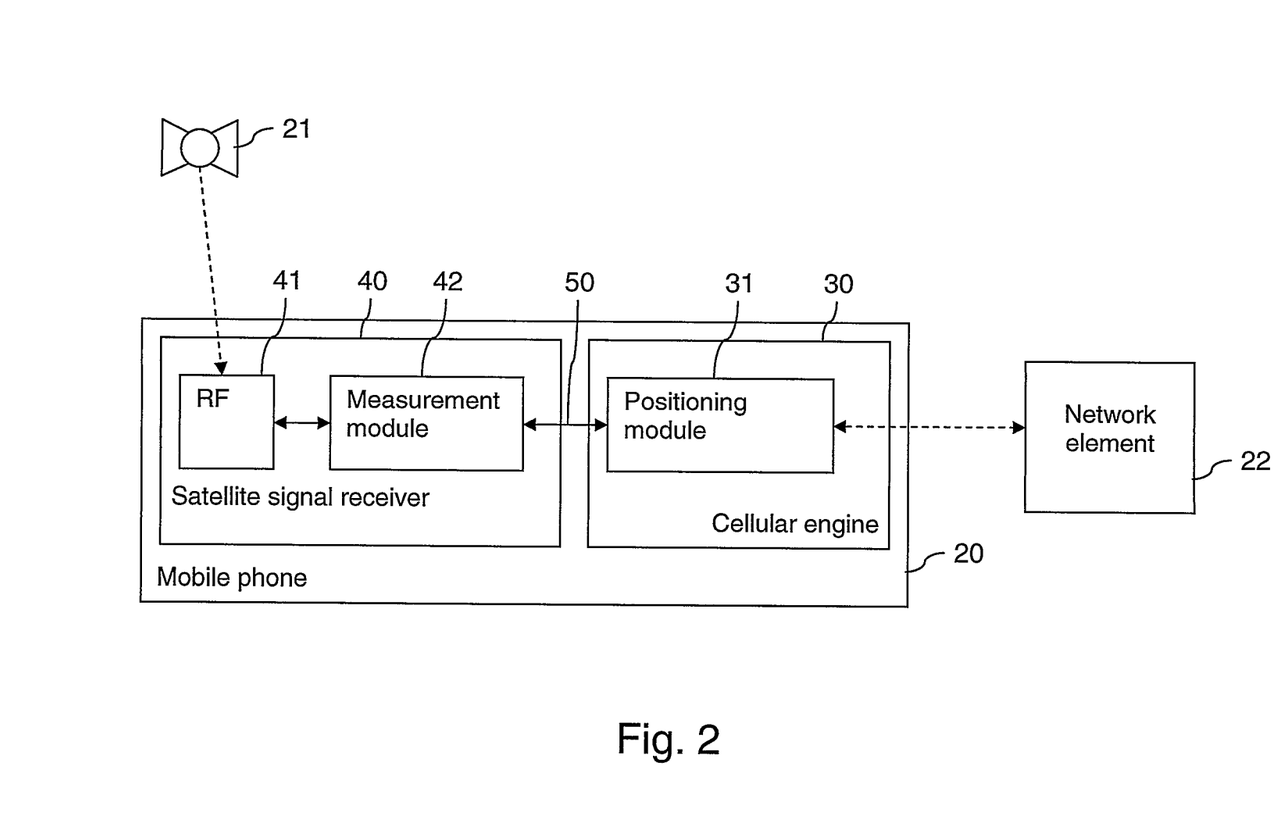
FIG. 2 is a schematic block diagram of a satellite based positioning system according to an embodiment of the invention.

FIG. 2 is a schematic block diagram of a satellite based positioning system, in which satellite signal receiver functionalities are split up in accordance with the invention.

The system comprises a mobile phone 20, a satellite 21 and a network element 22 of a mobile communication network.

The mobile phone 20 is an exemplary arrangement according to the invention. It includes a cellular engine 30, that is, a module comprising all components required for a conventional mobile communication between the mobile phone 20 and the mobile communication network. The mobile phone 20 further includes a satellite signal receiver 40. The satellite signal receiver 40 comprises a conventional RF component 41. In contrast to a conventional satellite signal receiver, however, it does not comprise in addition a measurement and positioning component 15, but only a pure measurement module 42. A separated positioning module 31 is implemented in the cellular engine 30. The measurement module 42 and the positioning module 31 are interconnected by an interface (I/F) 50. The satellite signal receiver 40 may be realized in the form of a chip on which the RF component 41 and the measurement module 42 are implemented.

The satellite 21 is one of a plurality of satellites that orbit Earth and that transmit code modulated signals for enabling a satellite based positioning. The satellite 21 can be for example a GPS satellite, a GALILEO satellite or a GLONASS satellite.

The network element 22 can be for example a base station of a GSM network. Optionally, the network element 22 is enabled to provide mobile phones with assistance data for a satellite based positioning.

Figure 3:
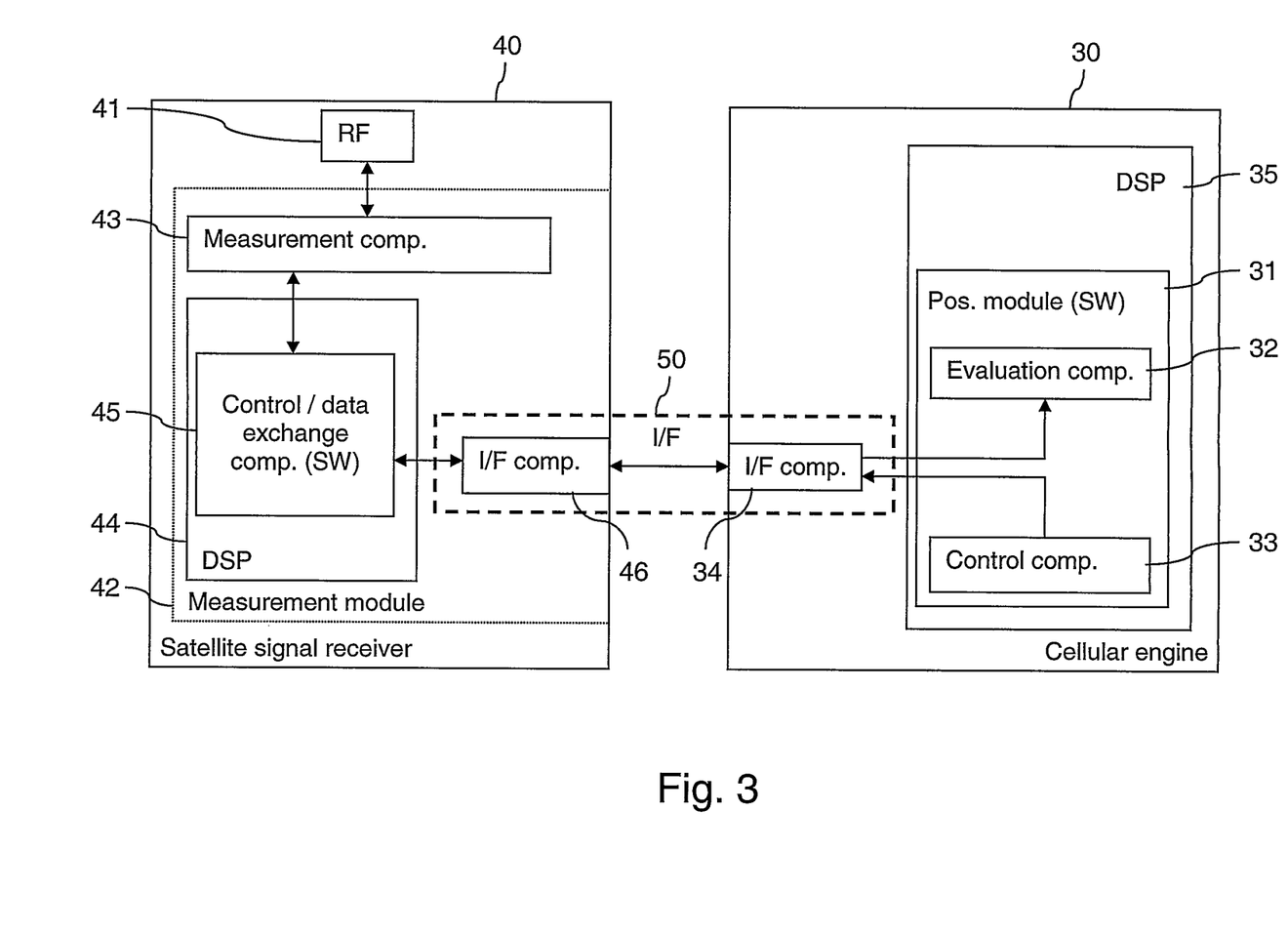
FIG. 3 is a schematic block diagram showing details of the system of FIG. 2.

Details of the cellular engine 30 and the satellite signal receiver 40 are depicted in FIG. 3.

As indicated already in FIG. 2, the satellite signal receiver 40 comprises an RF component 41 and a measurement module 42. The measurement module 42 is adapted to measure signals from GPS satellites, GLONASS satellites, GALILEO satellites or any combination of these.

The measurement module 42 includes to this end the actual measurement component 43 and a digital signal processor (DSP) 44 as a first processing unit. The DSP 44 is adapted to run a low-level control and data exchange component 45 software controlling the measurement component 43.

The measurement module 42 further includes as a first interface (I/F) component an I/F component 46 interacting with the control and data exchange component 45.

By way of example, the measurement component 43 is a pure baseband measurement component performing measurements in the baseband, but it could equally be adapted for performing RF measurements in addition or even comprise the entire RF component 41. It can be realized exclusively in hardware that is controlled by the control and data exchange component 45. Alternatively, it may comprise a memory for satellite signal samples and a processor for processing the sampled and stored satellite signals. It is to be understood that in the latter case, the processor may correspond to the DSP 44, which runs a suitable measurement software. In either case, the measurement component 43 is responsible for carrying out signal acquisition, signal tracking, code and carrier phase measurements, signal validation and reception of navigation data based on satellite signals received by the RF component 41.

The measurement module 42 is modeless, that is, its functionality is exactly the same regardless of the selected positioning method, like a standalone positioning method, a network assisted positioning method or a network based positioning method.

The cellular engine 30 comprises among other components a DSP 35 as another processing unit. The DSP 35 is adapted to run the cellular engine software, that is, a software supporting communications with the mobile communication network. This software can be for instance an ISA software or a Symbian software. The positioning module 31 is realized in software that is implemented in the cellular engine software and can thus be run equally by the DSP 35. The positioning module 31 comprises an evaluation component 32, which is adapted to perform positioning calculations, etc. The positioning module 31 further comprises a control component 33, which is adapted to assemble information for the measurements that are to be performed by the satellite signal receiver 40.

The cellular engine 30 further comprises as another interface component an I/F component 34 interacting with both the evaluation component 32 and the control component 33.

The I/F component 34, the I/F component 46 and a physical low-level connection between these components form the interface (I/F) 50, which enables a data exchange between the satellite signal receiver 40 and the positioning module 31. The connection can be, for example, an UART connection. The I/F component 34 and the I/F component 46 support the selected connection technology using a specific protocol.

Figure 4:
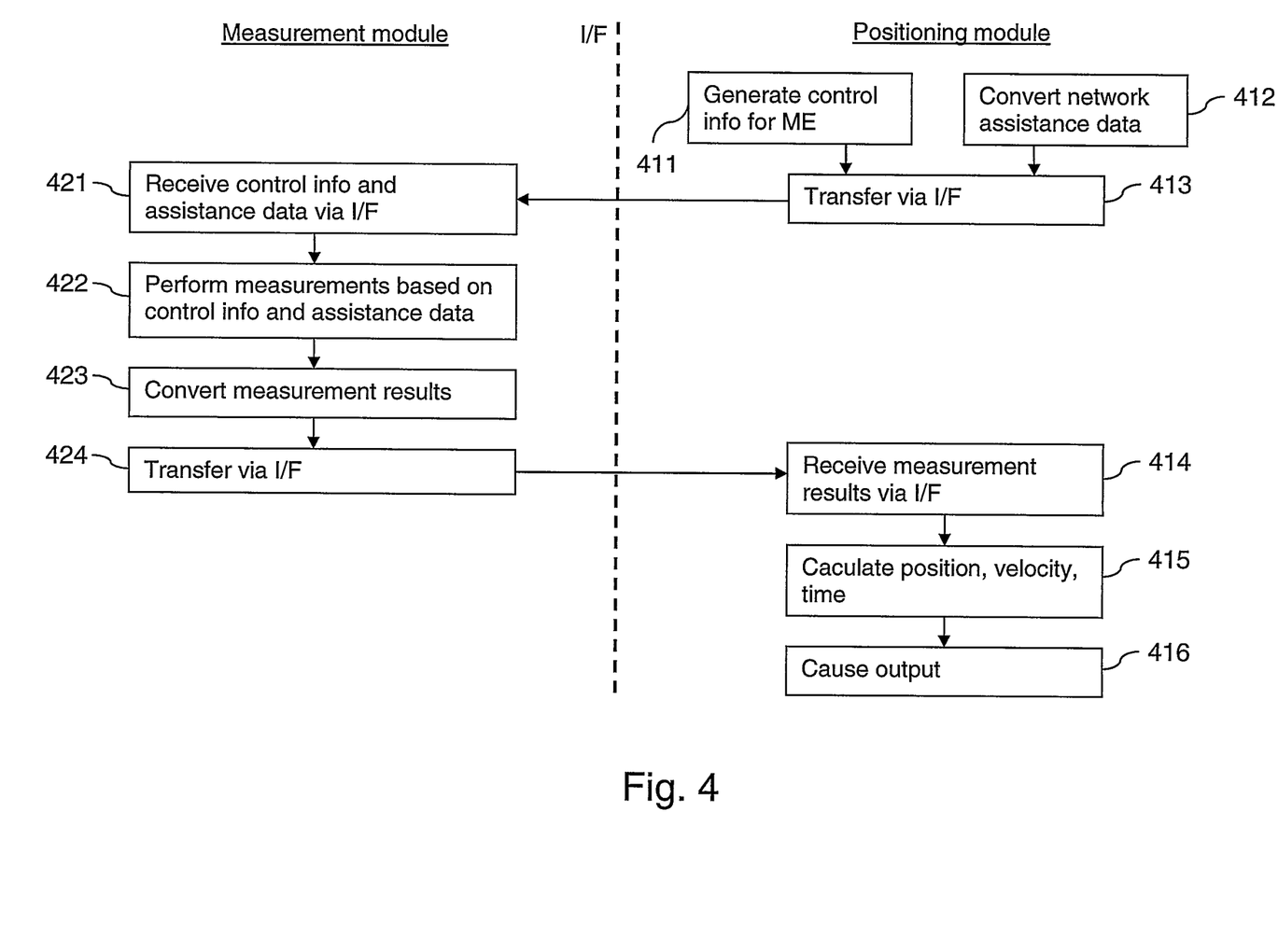
FIG. 4 is a flow chart illustrating an operation in the system of FIGS. 2 and 3.

The operation in the system of FIGS. 2 and 3 will now be described in more detail with reference to the flow chart of FIG. 4.

When a positioning of the mobile phone 20 is to be performed, the control component 33 generates control parameters for the satellite signal receiver 40. The control component 33 produces low-level parameters indicating whether the measurement module 42 should acquire GPS signals, GLONASS signals, GALILEO signals, or any combination of these signals. This implies for instance an indication of the expected signal code phases, of the expected Doppler frequency, of expected code and Doppler uncertainties, of details about a reference frequency and of details about a reference time. The control component 33 produces moreover low-level control parameters for causing the measurement module 42 to enter a certain state, for instance a power-save state, a power-off state, a power-on state, a self-testing state, etc. The generated control parameters have a predetermined "satellite positioning system format" that can be used by the control and data exchange component 45. (step 411)

In addition, the control component 33 may convert available assistance data into a suitable format for the measurement module 42. The assistance data may be provided to the control component 33 for example by the network element 22 of the mobile communication network or by other sources, for instance by a Wireless Local Area Network (WLAN) or from a memory. The assistance data may comprise for example information on a reference position, which allows limiting the search during an acquisition of satellite signals. In order to convert the assistance data into a suitable format, the control component 33 removes dependencies from assistance data protocols and converts the assistance data into the "satellite positioning system format". The control component 33 also generates the necessary response messages to the entities providing the assistance data using the required protocol, for example the RRLP. (step 412)

The I/F component 34 transfers the generated control and assistance data to the I/F component 46 of the measurement module 42, using the implemented connection technology and thus a predetermined I/F format for the generated control and assistance data. (step 413)

The I/F component 46 of the measurement module 42 receives the control and assistance data in the I/F format, regains the original "satellite positioning system format" of the control and assistance data, and provides the control and assistance data to the control and data exchange component 45. (step 421)

The control and data exchange component 45 controls the operation of the measurement component 43 in accordance with the configuration parameters provided by the control component 33. More specifically, the data exchange component 45 may cause a corresponding frequency calibration, a corresponding time calibration, a corresponding AGC tuning, a corresponding PPS generation, a corresponding signal acquisition, a corresponding signal tracking, a corresponding measurement data response and determine the respective measurement interval. Further, it takes care of power-savings in accordance with the control data. The measurement component 43 provides the measurement results to the control and data exchange component 45. The measurement results may comprise for example an identification of the satellites from which signals have been acquired, the time of reception of the acquired satellite signals, decoded navigation information, etc. (step 422)

The control and data exchange component 45 converts the measurement results into a suitable low-level "position calculations format" for position calculations in the positioning module 31. (step 423)

The I/F component 46 transfers the converted measurement results to the I/F component 34 of the cellular engine 30, using the implemented connection technology and thus the predetermined I/F format for the converted measurement results. (step 424)

The I/F component 34 of the cellular engine 30 receives the converted measurement results in the I/F format, regains the original "position calculations format" of the converted measurement results and provides the converted measurement results to the evaluation component 32. (step 414)

Based on the measurement results, the evaluation component 32 carries out position information calculations, including for instance a computation of the current position of the mobile phone 20, a computation of the current velocity of the mobile phone 20 and a computation of the current time. It has to be noted that the evaluation component 32 may receive additional information supporting the position information calculations, for instance measurements on signals exchanged with the network element 22 of the mobile communication network or ephemeris data provided by the network element 22, etc. (step 415)

The results of the position information calculations may then be presented to a user or be used as input data for some application, like a navigation application. (step 416)

It is to be noted that the described embodiment constitutes only one of a variety of possible embodiments of the invention.

The invention claimed is:

1. An apparatus comprising:
a measurement component configured to perform measurements on received satellite signals;
a first processor, with a software code, configured to control said measurement component based on received control parameters; and
a first interface component configured to receive control parameters via another interface component from another processor external to said apparatus, and configured to provide said control parameters to said first processor;
said first processor, with said software code, being further configured to convert measurement results of said measurement component into a suitable format for position information calculations at said other processor; and
said first interface component being further configured to forward said converted measurement results via said other interface component to said other processor.

2. The apparatus according to claim 1, wherein said measurement component is configured to perform measurements on received satellite signals transmitted by satellites of at least two different satellite positioning systems, depending on control parameters provided by said other processor.

3. The apparatus according to claim 1, wherein said first interface component is configured to employ a dedicated protocol for receiving control data and transmitting measurement results.

4. The apparatus according to claim 1, wherein said first processor, with said software code, is configured to control said measurement component for providing measurement results for at least two of the following positioning modes: a standalone positioning, a network assisted positioning and a network based positioning.

5. The apparatus according to claim 4, wherein said first processor, with said software code, is configured to control said measurement component essentially in the same manner for each of said at least two positioning modes.

6. The apparatus according to claim 1, wherein said measurement results of said measurement component comprise decoded navigation information.

7. The apparatus according to claim 1, wherein said apparatus is a satellite signal receiver.

8. A mobile arrangement comprising:
the apparatus according to claim 1;
said other processor, wherein said other processor, with a control software, is configured to generate control parameters for said measurement component and wherein said other processor, with an evaluation software, is configured to process measurement results provided by said measurement component and converted into a suitable format; and
said other interface component, wherein said other interface component is configured to transfer control parameters generated by said other processor to said first interface component and to forward measurement results received from said first interface component to said other processor.

9. The mobile arrangement according to claim 8, wherein said other processor, with said control software, is configured to generate control parameters for said measurement component in a format which is suitable for said apparatus.

10. The mobile arrangement according to claim 9, wherein said other processor, with said control software, is configured to generate control parameters for said measurement component by converting available assistance data into a protocol independent format which is suitable for said apparatus.

11. The mobile arrangement according to claim 8, wherein said first interface component is further configured to forward measurement results not related to satellite positioning from said measurement component to said other interface component, and wherein said other interface component is configured to forward said measurement results received from said first interface component to said other processor.

12. The mobile arrangement according to claim 8, wherein said first processor and said other processor are configured to support at least two of the following positioning modes: a standalone positioning, a network assisted positioning and a network based positioning, wherein said first processor is configured to control said measurement component essentially in the same manner for each of said at least two positioning modes and wherein said other processor is configured to perform said processing of measurement results essentially in the same manner for each of said at least two positioning modes.

13. The mobile arrangement according to claim 8 comprising a mobile communication device, wherein said control software and said evaluation software are implemented in a software that is configured to support communications of said mobile communication device via a mobile communication network.

14. The mobile arrangement according to claim 8, wherein said mobile arrangement is a mobile communication device.

15. The mobile arrangement according to claim 8 comprising a mobile communication device, which includes said other processor and said other interface component, wherein said apparatus is a satellite signal receiver configured as an accessory device for said mobile communication device.

16. An interface for a mobile arrangement supporting a satellite based positioning, which mobile arrangement comprises a satellite signal receiver, including a measurement component and a first processor, and which mobile arrangement comprises another processor,
wherein said interface is configured to enable a communication between said satellite signal receiver and said other processor;
wherein said interface comprises a first interface component in said satellite signal receiver and another interface component;
wherein said first interface component is configured to receive control parameters from said other interface component, to provide said control parameters to said first processor and to forward measurement results from said measurement component, which have been converted by said first processor into a suitable format for position information calculations at said other processor, to said other interface component; and
wherein said other interface component is configured to transfer control parameters generated by said other processor to said first interface component and to forward measurement results received from said first interface component to said other processor.

17. The interface according to claim 16, wherein said first interface component is further configured to forward measurement results not related to satellite positioning from said measurement component to said other interface component, and wherein said wherein said other interface component is configured to forward said measurement results received from said first interface component to said other processor.

18. A method for supporting a satellite based positioning in a mobile arrangement, wherein said mobile arrangement comprises a satellite signal receiver, including a measurement component and a first processor, and wherein said mobile arrangement comprises another processor, said method comprising:
- receiving in said satellite signal receiver control parameters from said other processor via an interface;
- controlling in said satellite signal receiver measurements on received satellite signals by said measurement component by means of said first processor based on said received control parameters;
- converting measurement results of said measurement component into a suitable format for position information calculations in said other processor; and
- transferring converted measurement results of said measurement component via said interface to said other processor.

19. The method according to claim 18, wherein said measurement results of said measurement component comprise decoded navigation information.

20. The method according to claim 18, further comprising:
- generating, by said other processor, control parameters for said measurement component;
- processing, by said other processor, measurement results provided by said measurement component;
- transferring, by said other interface component, control parameters generated by said other processor to said first interface component; and
- forwarding, by said other interface component, measurement results received from said first interface component to said other processor.

21. A non-transitory software program product in which a software code for a mobile arrangement supporting a satellite based positioning is stored such that it readable by a processor, wherein said mobile arrangement comprises a satellite signal receiver, including a measurement component and a first processor, and wherein said mobile arrangement comprises another processor, said software code causing the satellite signal receiver to perform the following when running in said first processor:
- receiving in said satellite signal receiver control parameters from said other processor via an interface;
- controlling in said satellite signal receiver measurements on received satellite signals by said measurement component by means of said first processor based on said received control parameters;
- converting measurement results of said measurement component into a suitable format for position information calculations in said other processor; and
- transferring converted measurement results of said measurement component via said interface to said other processor.

* * * * *